(12) United States Patent
Pohm

(10) Patent No.: US 9,805,186 B2
(45) Date of Patent: *Oct. 31, 2017

(54) HARDWARE PROTECTION FOR ENCRYPTED STRINGS AND PROTECTION OF SECURITY PARAMETERS

(71) Applicant: Adobe Systems Incorporated, San Jose, CA (US)

(72) Inventor: David Pohm, Longmont, CO (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,185

(22) Filed: Mar. 3, 2015

(65) Prior Publication Data

US 2017/0004300 A1    Jan. 5, 2017

Related U.S. Application Data

(63) Continuation of application No. 12/394,026, filed on Feb. 26, 2009, now Pat. No. 9,003,201.

(60) Provisional application No. 61/031,591, filed on Feb. 26, 2008.

(51) Int. Cl.
| | | |
|---|---|---|
| *G06F 21/44* | (2013.01) | |
| *G06F 21/78* | (2013.01) | |
| *G06F 21/60* | (2013.01) | |
| *H04L 9/06* | (2006.01) | |

(52) U.S. Cl.
CPC ............ *G06F 21/44* (2013.01); *G06F 21/602* (2013.01); *G06F 21/78* (2013.01); *H04L 9/06* (2013.01)

(58) Field of Classification Search
CPC ........ G06F 21/78; G06F 21/44; G06F 21/602; H04L 9/06

USPC ........................................................ 713/193
See application file for complete search history.

(56) References Cited

U.S. PATENT DOCUMENTS

| | | |
|---|---|---|
| 2002/0133396 A1 | 9/2002 | Barnhart |
| 2004/0193905 A1 | 9/2004 | Lirov et al. |
| 2006/0095376 A1 | 5/2006 | Mitchell et al. |
| 2008/0101607 A1 | 5/2008 | Liang et al. |
| 2008/0120676 A1 | 5/2008 | Morad et al. |
| 2008/0283963 A1 | 11/2008 | Chung et al. |
| 2010/0316216 A1 | 12/2010 | Fukushima et al. |

FOREIGN PATENT DOCUMENTS

WO    WO 2007/121587    11/2007

OTHER PUBLICATIONS

National Institute of Standards and Technology NIST Special Publication 800-57 Recommendation for Key Management—Part 1: General (Revised Mar. 2007).

(Continued)

*Primary Examiner* — Kambiz Zand
*Assistant Examiner* — Benjamin Kaplan
(74) *Attorney, Agent, or Firm* — Kilpatrick Townsend & Stockton LLP

(57) ABSTRACT

In one embodiment, a disk drive is provided that is adapted for security authentication. The disk drive includes: a non-volatile memory storing object code; a processor for retrieving the stored object code; a decryption engine for decrypting a retrieved shared secret from the object code; and a first memory for storing the decrypted retrieved shared secret; wherein the processor is configured to overwrite the written decrypted retrieved shared secret after it has been used in an authentication procedure.

14 Claims, 2 Drawing Sheets

(56) References Cited

OTHER PUBLICATIONS

National Institute of Standards and Technology NIST Special Publication 800-57 Recommendation for Key Management—Part 2: Best Practices for Key Management Organization (Mar. 2007).
Deleting Sensitive Information Why hitting delete isn't enough by Hans Zetterstrom Version 1.3 © SANS Institute 2002.
Handbook of Applied Cryptography, by A. Menezes, P. van Oorshot, and S. Vanstone, CRC Press, 1996 Chapters 10 and 12.
Self-Encrypting Hard Disk Drives in the Data Center Copyright © 2007 Seagate Technology LLC.

HARDWARE PROTECTION FOR ENCRYPTED STRINGS AND PROTECTION OF SECURITY PARAMETERS

RELATED APPLICATION

This application is a continuation of U.S. patent application Ser. No. 12/394,026, filed on Feb. 26, 2009, which claims the benefit of U.S. Provisional Application No. 61/031,591, filed Feb. 26, 2008, the contents of which are incorporated by reference.

BACKGROUND

Boot memory is used for processor startup. The processor begins by retrieving a command at an initial boot address and then progressively retrieves object code until it is configured. There are many circumstances where the source code contains a secret that must be protected from unauthorized users and third parties. For example, an authentication procedure may be performed between two parties where each party proves possession of a shared secret—once either party proves to the other that it is in possession of the shared secret, the devices proves to be a trusted party. If the shared secret is compromised, unauthorized parties may be authenticated, which destroys desired security. If the object code is stored as clear text, then such a shared secret could be compromised by simply reading the non-volatile memory at the proper address.

Accordingly, there is a need in the art for encryption devices and methods for protecting sensitive information that is stored in object code.

SUMMARY

In accordance with an embodiment of the invention, a disk drive is provided that includes: a non-volatile memory storing object code; a processor for retrieving the stored object code; a decryption engine for decrypting a retrieved shared secret from the object code; and a first memory for storing the decrypted retrieved shared secret; wherein the processor is configured to overwrite the written decrypted retrieved shared secret after it has been used in an authentication procedure.

In accordance with an embodiment of the invention, a method is provided that includes the acts of: within a disk drive, retrieving object code from a non-volatile memory, the object code containing an encrypted secret; decrypting the encrypted retrieved secret within a decryption engine within the disk drive; writing the decrypted retrieved secret to a first memory; using the stored decrypted retrieved secret to authenticate the disk drive to a host; and writing over the stored decrypted retrieved secret to erase it from the memory.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
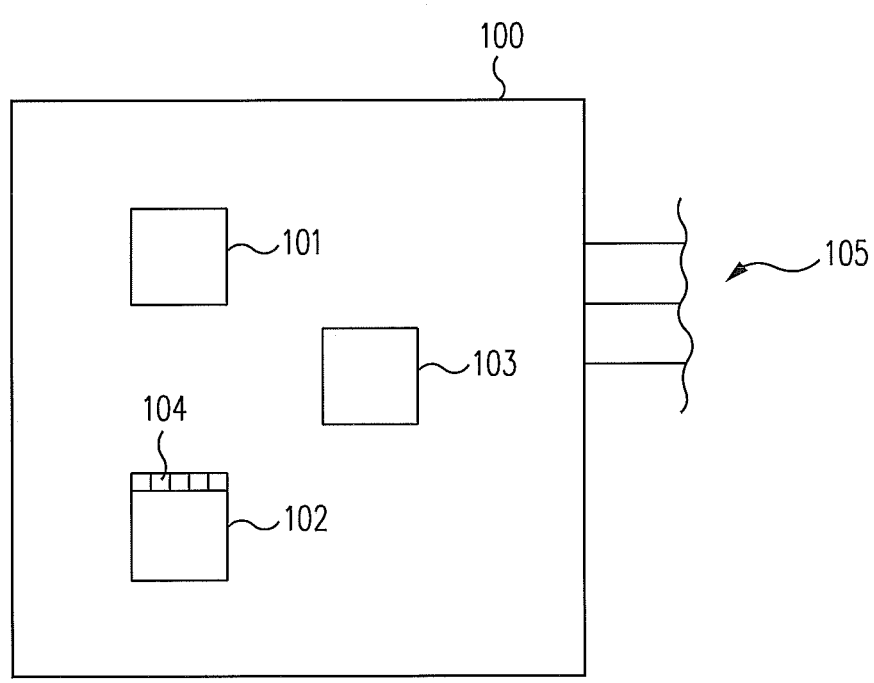
FIG. 1 shows an example disk drive with an embedded decryption engine.

Turning now to FIG. 1, an example device 100 is shown that includes a non-volatile memory storing object code that contains an encrypted secret. Device 100 includes a processor 102 (or other startup engine) that retrieves the object code from non-volatile memory 101 to begin, for example, a boot-up procedure. Thus, during the boot-up of processor 102, the encrypted secret is retrieved. Processor 102 is configured to recognize this encrypted secret through, for example, an appropriate header or other identification means. Alternatively, processor 102 may be hard-wired to recognize a certain address within non-volatile memory 101 as the location for the encrypted secret. It will be appreciated that more than one encrypted secret may be stored in non-volatile memory 101 such that the discussion of retrieving a single encrypted secret is illustrative only and not intended to be limiting.

Once processor 102 has retrieved the encrypted secret, a decryption engine 103 within disk drive 100 decrypts the encrypted secret to produce the secret in clear text form. Because decryption engine 103 is embedded within drive 100, the decryption of the encrypted secret occurs without outside world intervention, thereby enhancing security. For example, decryption engine 103 may comprise a linear feedback shift register that generates a pseudo-random number using an initial seed stored in a non-volatile memory such as read-only memory (ROM) (not illustrated) associated with the decryption engine 103. The initial seed is thus never communicated outside drive 100 such that a hacker would have to reverse engineer the ROM to determine the initial seed for the pseudo-random number generation, which is very difficult and expensive. It will be appreciated that other types of decryption engines may also be implemented. In addition, the decryption engine may simply comprise a software process within processor 102. Disk drive 100 may include any suitable drive, such as a USB FLASH drive, a DVD drive, or a magnetic hard disk drive.

Once the decryption engine 103 has decrypted the retrieved secret, it may be used by drive 100 such as in an authentication procedure. For example, processor 102 may write the decrypted secret to a non-volatile memory such as a plurality of registers 104. In this fashion, the decrypted secret is available in clear text form for use by processor 102. To preserve security of the decrypted secret, processor 102 is configured to over-write the stored clear-text secret once it has been used.

Figure 2:
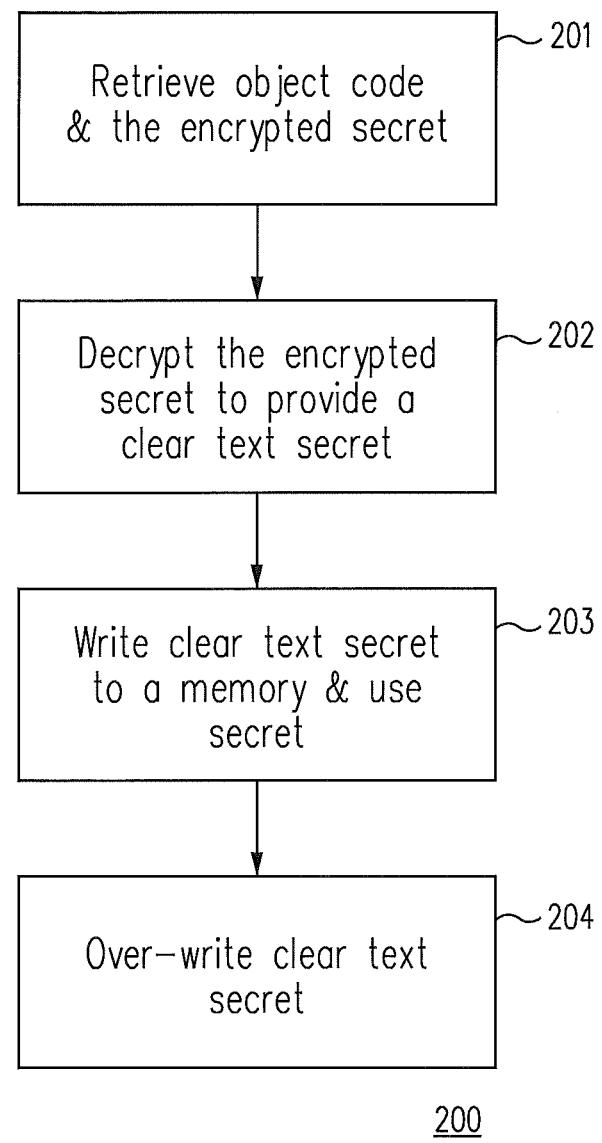
FIG. 2 is a flowchart for the decryption method practiced by the drive of FIG. 1.

Turning now to FIG. 2, a decryption method 200 practiced by device 100 is illustrated. In step 201, the stored object code within the non-volatile memory 101 of FIG. 1 is retrieved along with the encrypted secret. As discussed above, the encrypted secret may be identified using an appropriate header. Alternatively, it may be stored in an identified address to identify the location of the encrypted secret. In step 202, the decryption engine 103 decrypts the retrieved encrypted secret to provide a clear-text secret. In step 203, the clear-text secret is written to a memory so that it may be accessed for use. For example, drive 100 may prove possession of the secret through a bus 105 to an external device. It will be appreciated that proving possession of the secret does not entail simply communicating the secret to the external world. Instead, the secret may be hashed, for example, to provide a string. This string is then communicated over bus 105 to an external device that also is in possession of the secret. By hashing its own secret and comparing the result to the string provided by drive 100, drive 100 may be authenticated to the external device by proving possession of the secret. Finally, in step 204, the clear-text secret is overwritten.

It will be appreciated that prior to method 200, the object code (including the encrypted secret) is written to non-volatile memory 101. Consider the advantages of this decryption method—the device will never have to communicate the clear-text secret to outside devices but instead may simply prove possession of the secret such as in a shared secret mutual authentication procedure. The clear-text secret is only stored for a limited period of time (such as the duration of the shared secret authentication procedure) and is then erased by being overwritten. Moreover, the decryption of the encrypted secret occurs within hardware (or software) within the device and is thus inherently robust to prying outsiders such as hackers attempting to gain possession of the secret.

The above-described embodiments are merely meant to be illustrative and not limiting. For example, the secret may be used in alternative procedures in addition to shared secret authentication. Moreover, any device that includes object code that includes an encrypted secret will benefit from the decryption methods discussed herein. It will thus be obvious to those skilled in the art that various changes and modifications may be made without departing from this invention in its broader aspects. The appended claims encompass all such changes and modifications as fall within the true spirit and scope of this invention

The invention claimed is:

1. A data drive adapted for security authentication, the data drive comprising:
 a non-volatile memory storing object code for booting a first computing device;
 a processor configured for retrieving a shared secret from the stored object code;
 a decryption engine for decrypting the shared secret retrieved from the object code; and
 a memory for storing the decrypted retrieved shared secret;
 wherein the processor is further configured for (i) proving possession of the decrypted shared secret to a second computing device that is external to the first computing device and (ii) overwriting the written decrypted retrieved shared secret after proving the possession of the decrypted shared secret to the second computing device and thereby proving the first computing device to be a trusted party.

2. The data drive of claim 1, wherein the non-volatile memory is a FLASH memory.

3. The data drive of claim 1, wherein the non-volatile memory is a ROM memory.

4. The data drive of claim 1, wherein the memory for storing the decrypted retrieved shared secret is the non-volatile memory.

5. The data drive of claim 1, wherein the memory for storing the decrypted retrieved shared secret is a volatile memory.

6. The data drive of claim 1, wherein the decryption engine is a linear feedback shift register (LFSR).

7. The data drive of claim 1, wherein the decryption engine is the processor.

8. A method comprising:
 retrieving, by a processor and from a non-volatile memory of a disk drive, object code for booting a first computing device, the object code containing an encrypted secret;
 retrieving, by the processor, the encrypted secret from the object code;
 decrypting, by the processor executing a decryption engine stored within the disk drive, the encrypted secret retrieved from the object code;
 writing the decrypted retrieved secret to a memory;
 proving, by the processor, possession of the decrypted secret to a second computing device that is external to the first computing device; and
 writing over the decrypted secret and thereby erasing the decrypted secret from the memory after proving the possession of the decrypted secret to the second computing device and thereby proving the first computing device to be a trusted party.

9. The method of claim 8, wherein the memory to which the decrypted secret is written is the non-volatile memory.

10. The method of claim 8, wherein the non-volatile memory is a FLASH memory.

11. The method of claim 8, wherein the non-volatile memory is a ROM memory.

12. The method of claim 8, wherein the non-volatile memory is an optical disk.

13. The method of claim 8, wherein the non-volatile memory is a magnetic hard disk drive.

14. The method of claim 8, wherein the non-volatile memory is a disk drive.

* * * * *